(12) United States Patent
Mizukami et al.

(10) Patent No.: US 8,349,505 B2
(45) Date of Patent: Jan. 8, 2013

(54) POWER GENERATION SYSTEM OF FUEL CELL AND CONTROL METHOD THEREOF

(75) Inventors: Takaaki Mizukami, Hitachi (JP); Hidekazu Fujimura, Mito (JP); Tsutomu Okusawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1863 days.

(21) Appl. No.: 11/214,856

(22) Filed: Aug. 31, 2005

(65) Prior Publication Data

US 2006/0046109 A1 Mar. 2, 2006

(30) Foreign Application Priority Data

Aug. 31, 2004 (JP) .................................. 2004-251671

(51) Int. Cl.
*H01M 8/06* (2006.01)
*H01M 8/04* (2006.01)
(52) U.S. Cl. .................... 429/427; 429/428; 429/408
(58) Field of Classification Search .................. 429/408, 429/427–428
See application file for complete search history.

(56) References Cited

U.S. PATENT DOCUMENTS

| | | | | |
|---|---|---|---|---|
| 7,455,921 B2 * | 11/2008 | Okamoto | ........................ | 429/17 |
| 2002/0177016 A1 * | 11/2002 | Okamoto | ........................ | 429/20 |

FOREIGN PATENT DOCUMENTS

| | | |
|---|---|---|
| JP | 8-250142 | 9/1996 |
| JP | 8-255621 | 10/1996 |
| JP | 2002-289226 | 10/2002 |
| JP | 2004-178965 | 6/2004 |

OTHER PUBLICATIONS

Japanese Office Action for Application No. 2004-251671.

* cited by examiner

*Primary Examiner* — Karie O'Neill Apicella
(74) *Attorney, Agent, or Firm* — Antonelli, Terry, Stout & Kraus, LLP (57) ABSTRACT

A fuel cell power generation system of the invention includes a hydrogen supply unit for reforming hydrocarbon fuel to generate reformed gas including hydrogen or generating reaction gas including the hydrogen from a hydrogen material, an oxygen supply unit, a fuel cell for receiving the hydrogen from the hydrogen supply unit and oxygen from the oxygen supply unit, for power generation, temperature sensors each for detecting a temperature of the hydrogen supply unit, and a temperature control unit for adjusting generated power, thereby controlling the temperature of the hydrogen supply unit, based on the detected temperature. The temperature control unit includes a target power setting unit for setting first and second target powers as generated power target values, and a target power switching unit for performing target value switching between the first and second target powers according to a predetermined change in the detected temperature.

9 Claims, 5 Drawing Sheets

POWER GENERATION SYSTEM OF FUEL CELL AND CONTROL METHOD THEREOF

BACKGROUND OF THE INVENTION

The present invention relates to a power generation system of a fuel cell including a temperature control device for a hydrogen supply unit therein. In this system, the fuel cell receives hydrogen from the hydrogen supply unit and oxygen from an oxygen supply unit, for power generation. Then, unconverted gas discharged from the fuel cell is employed as a heat source for the hydrogen supply unit.

In recent years, due to improvement in electrochemical characteristics of a solid polymer membrane, implementation of a household polymer membrane fuel cell system as an on-site type distributed power source has been expected. When this household fuel cell system is commercialized, a higher efficiency than that of a conventional power generation system is expected. Thus, various proposals have been made to achieve the higher efficiency.

As an example of the polymer membrane fuel cell power generation system, there is well known the system in which hydrocarbon fuel is reformed to produce hydrogen and carbon monoxide is removed from the reformed gas in a reformer, and the resulting gas is then supplied to the fuel cell. Then, the fuel cell consumes hydrogen in the reformed gas and oxygen in air, thereby performing power generation. Unconverted gas discharged from the fuel cell is used as the heat source for reforming the hydrocarbon fuel by the reformer.

In this power generation system, a reformed-gas system of the power generation system is configured to include the reformer, the fuel cell, a heat exchanger and the like. In order to operate the system with the higher efficiency, the reformed gas is delivered from the reformer and circulates through the fuel cell, the heat exchanger and the like, and the combustion unit of the reformer again. In this configuration, the reformed-gas system becomes a closed system. Accordingly, when some disturbance is caused, the amount of heat to be supplied to the combustion unit of the reformer will be changed. As such disturbance, a fluctuation in the amount of the gas supplied, changes in the amount of hydrogen produced and the chemical composition of the reformed gas due to degradation of a catalyst in the reformer, a change in an outside air temperature, and the like can be pointed out. This system, however, has no buffering mechanism for stabilizing the power generation system. Thus, when the some disturbance is given, it becomes considerably difficult to operate the power operation system with stability.

Then, in order to address the problem described above, JP-A-8-255621 discloses a technique for controlling the temperature of the reaction unit of a reformer. In this technique, a fuel cell main body is divided into a plurality of portions, and the divided fuel cell portions are arranged in series. Fuel off-gas from a divided fuel cell portion in the last stage is supplied to the burner of the reformer. Thus, by controlling the generated power of the divided fuel cell portion in this last stage, the temperature of the reaction unit of the reformer is controlled.

In the technique disclosed in JP-A-8-255621, however, the fuel cell main body must be divided into the plurality of the portions. Accordingly, the configuration of the system becomes complicated.

SUMMARY OF THE INVENTION

An object of the present invention is therefore to provide a fuel cell power generation system, in which even if some disturbance is given, temperature control over the reaction portion of a hydrogen supply unit is implemented using a simple configuration, thereby enabling stable operation of the fuel cell power generation system.

In a preferred aspect of the present invention, as target values of the generated power of a fuel cell, first target power PT and second target power PL with a predetermined amount of power reduced from the first target power PT are set. Then, a target power switching unit is provided. This target power switching unit performs target value switching of the generated power of the fuel cell between the first and second target powers according to a predetermined change in the temperature of the reaction portion of hydrogen supply unit constituted from a reformer or a hydrogen generation unit.

Preferably, the first target power PT and the second target power PL for the generated power of the fuel cell are set in advance in view of a hydrogen utilization factor at which no deficiency of hydrogen would not occur and the power generation efficiency of the fuel cell.

A fuel cell power generation system according to other preferable aspect of the present invention includes a temperature control unit for controlling the generated power of a fuel cell so that the temperature detected by at least one of temperature sensors that detect the temperatures of a hydrogen supply unit is held within a predetermined range. The predetermined range includes a first predetermined range and a second predetermined range. Then, the temperature control means includes:

a first temperature control unit for increasing or decreasing supply of an oxidizer (or air) for combustion to the hydrogen supply unit when the detected temperature falls outside the first predetermined range; and a second temperature control unit for increasing or decreasing the generated power of the fuel cell when the detected temperature falls outside the second predetermined range.

According to the preferable aspects of the present invention, even if some disturbance has been given to the system, the temperature of the hydrogen supply unit can be maintained within a predetermined temperature range, using the simple configuration. Stability of the fuel cell power generation system can be thereby maintained. Then, by setting the second target power PL for the generated power of the fuel cell to a desired value, the amount of the generated power and the efficiency of the fuel cell can be held within allowable ranges.

Other object and features of the present invention will be made clear from descriptions of the following embodiments that will be described below.

DESCRIPTION OF THE EMBODIMENTS

Now, embodiments of the present invention will be described with reference to the appended drawings.

Figure 1:
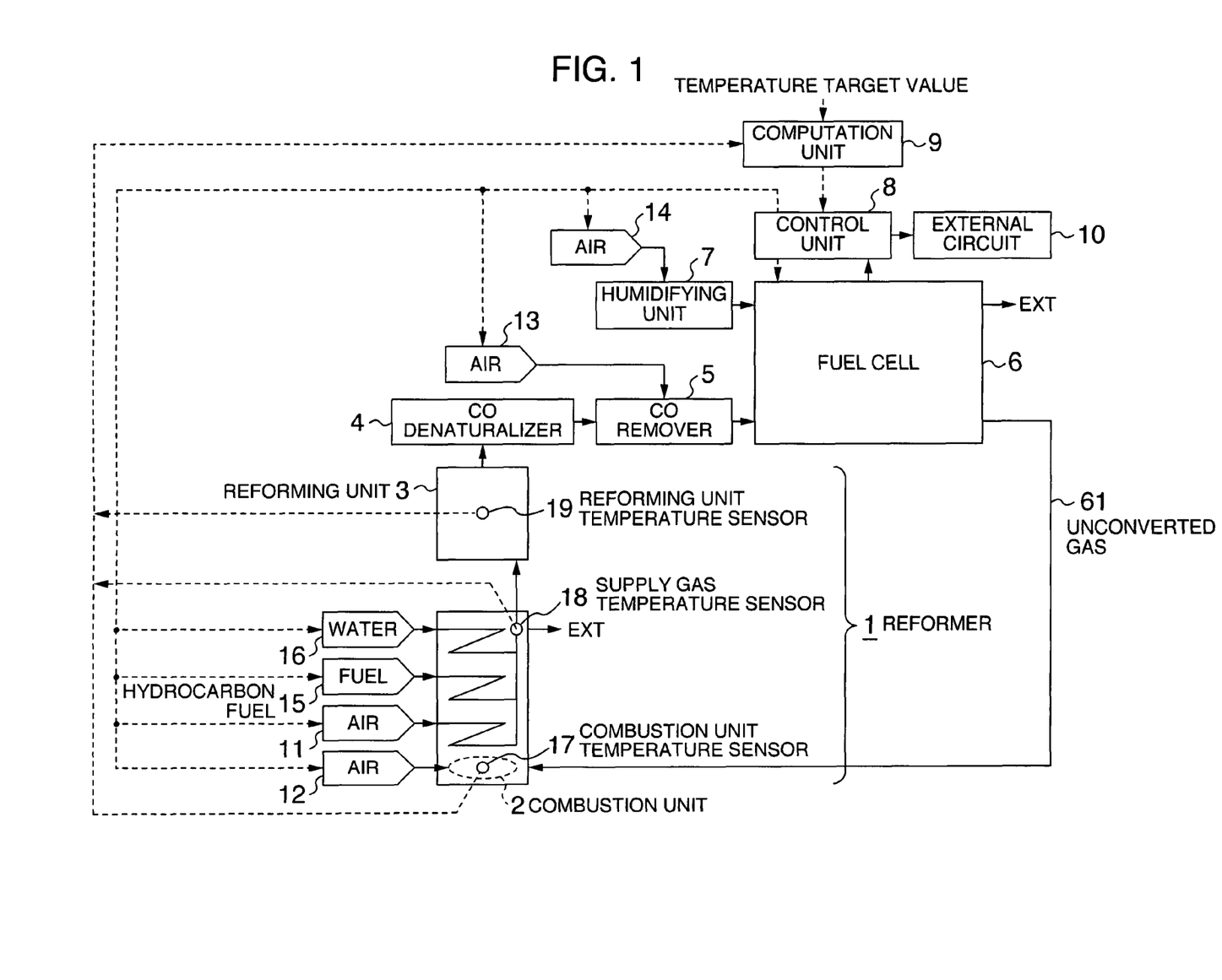
FIG. 1 is a block diagram showing a configuration of a fuel cell power generation system according to a first embodiment of the present invention.

FIG. 1 is a block diagram showing a configuration of a fuel cell power generation system according to a first embodiment of the present invention. A fuel cell 6 generates power by reaction between hydrogen as the fuel and oxygen in the air. A polymer membrane fuel cell, for example, is employed as the fuel cell 6. The fuel cell power generation system in this embodiment includes a CO denaturalizer 4 and a CO remover 5. The CO denaturalizer 4 reduces the CO concentration of reformed gas generated at a reformer 1. The reformer 1 generates the reformed gas including hydrogen. The CO remover 5 supplies to the fuel cell 6 gas with carbon monoxide reduced. A humidifying unit 7 supplies oxygen in air 14. On the other hand, a control unit 8 controls hydrocarbon fuel 15, air 11, and water 16 to be supplied to the reformer 1. The control unit 8 also controls air 12 for combustion to be supplied to a combustion unit 2 of the reformer 1. The control unit 8 further controls air 13 to be supplied to the CO remover 5, air 14 to be supplied to the fuel cell 6, and a generated power output (an output current and an output voltage), and supplies the generated power to an external circuit 10. Unconverted gas 61 including components such as hydrogen and methane discharged from the fuel cell 6 is supplied as fuel for the combustion unit 2 included in the reformer 1. The combustion unit 2 burns the unconverted gas 61 to generate heat for proceeding the reforming reaction.

In this fuel cell power generation system, sensors each for detecting a temperature of the reformer 1, such as a combustion unit temperature sensor 17, a supply gas temperature sensor 18, and a reforming unit temperature sensor 19 are installed. One or a combination of measured temperatures detected by these sensors is captured by a computation unit 9. Then, in response to establishment of a predetermined relationship between one or a combination of these detected temperatures and a given temperature target value, the control unit 8 controls the output power to be supplied to the external circuit 10 from the fuel cell 6.

Figure 2:
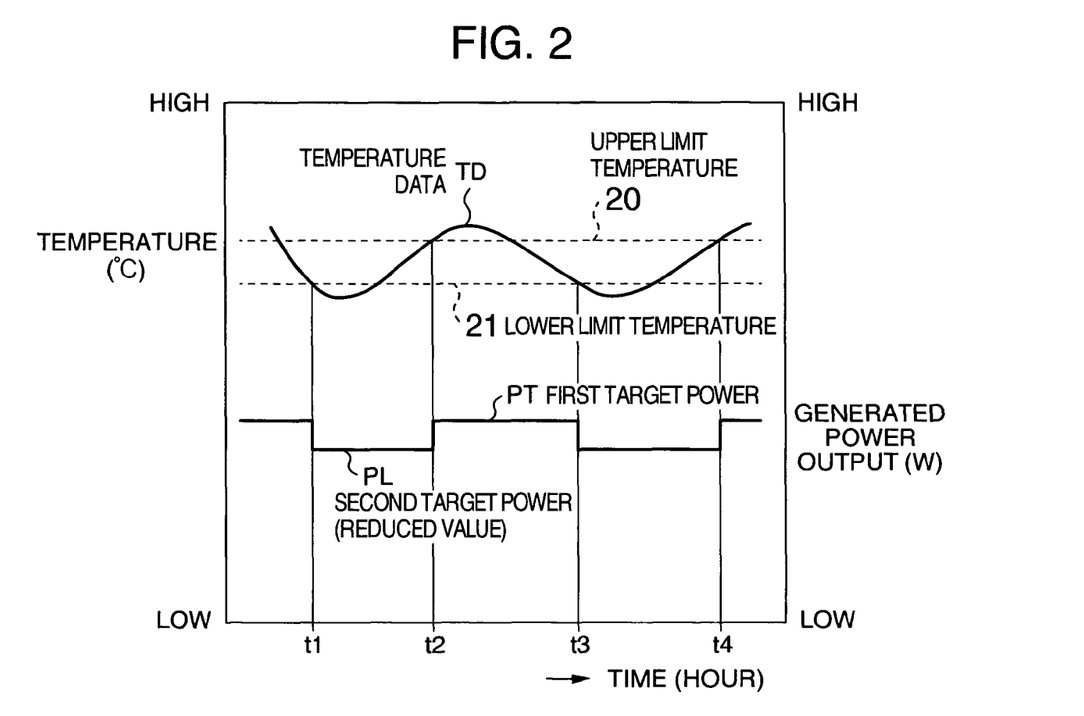
FIG. 2 is a graph explaining first temperature control processing that can be used in each of the first embodiment, a second embodiment, and a third embodiment of the present invention.

FIG. 2 is a graph explaining first temperature control processing that can be used in each of the first embodiment, a second embodiment, and a third embodiment of the present invention. First, an upper limit temperature 20 and a lower limit temperature 21 for temperature data TD are set. The temperature data TD represents the temperature of a predetermined portion of the reformer 1 to be detected. Next, first target power PT and second target power PL for the generated power of the fuel cell 6 are set. The second target power PL is the one from which a predetermined amount of the generated power of the fuel cell 6 has been reduced in view of a hydrogen utilization factor at which no deficiency of hydrogen would not occur if some possible disturbance is caused.

Assume that the temperature data TD captured from one or more of the reformer temperature sensors at a time t1 has become lower than the lower limit temperature 21, as shown in FIG. 2. This case indicates a situation in which the amount of heat of the reformer 1 is insufficient. Hence, the computation unit 9 and the control unit 8 reduce the generated power of the fuel cell 6 from the first target power PT that has been hitherto used to the reduced second target power PL. Accordingly, the unconverted gas 61 from the fuel cell 6 will increase. Then, the fuel to be supplied to the reformer 1 will be increased, so that the amount of heat in the combustion unit 2 will be increased. The temperature of the reformer 1 will be thereby recovered. Next, assume that the temperature data TD has exceeded the set upper limit temperature 20 at a time t2. When the temperature data TD has exceeded the upper limit temperature 20, the computation unit 9 and the control unit 8 switch the generated power of the fuel cell 6 to the first target power PT and perform control so that the generated power of the fuel cell 6 is increased. The amount of the unconverted gas 61 to be supplied as a heat source to the combustion unit 2 of the reformer 1 is thereby reduced, so that the amount of heat of the combustion unit 2 is reduced. As described above, when the temperature of the predetermined portion of the reformer 1 reaches the set upper limit temperature 20 or the set lower limit temperature 21, the computation unit 9 and the control unit 8 switch the target power and perform control, and function to maintain the temperature data TD captured from the one or more of the temperature sensors within a predetermined range.

Hence, according to this embodiment, even if some disturbance has been given to the fuel cell power generation system, the temperature of the hydrogen supply unit (or the reformer 1) can be maintained within the predetermined temperature range using a simple configuration, and stability of the fuel cell power generation system can be maintained. Then, by setting the first target power PT and the second target power PL for the generated power of the fuel cell to desired values, the amount of the generated power and power generation efficiency can be held within allowable ranges.

Figure 3:
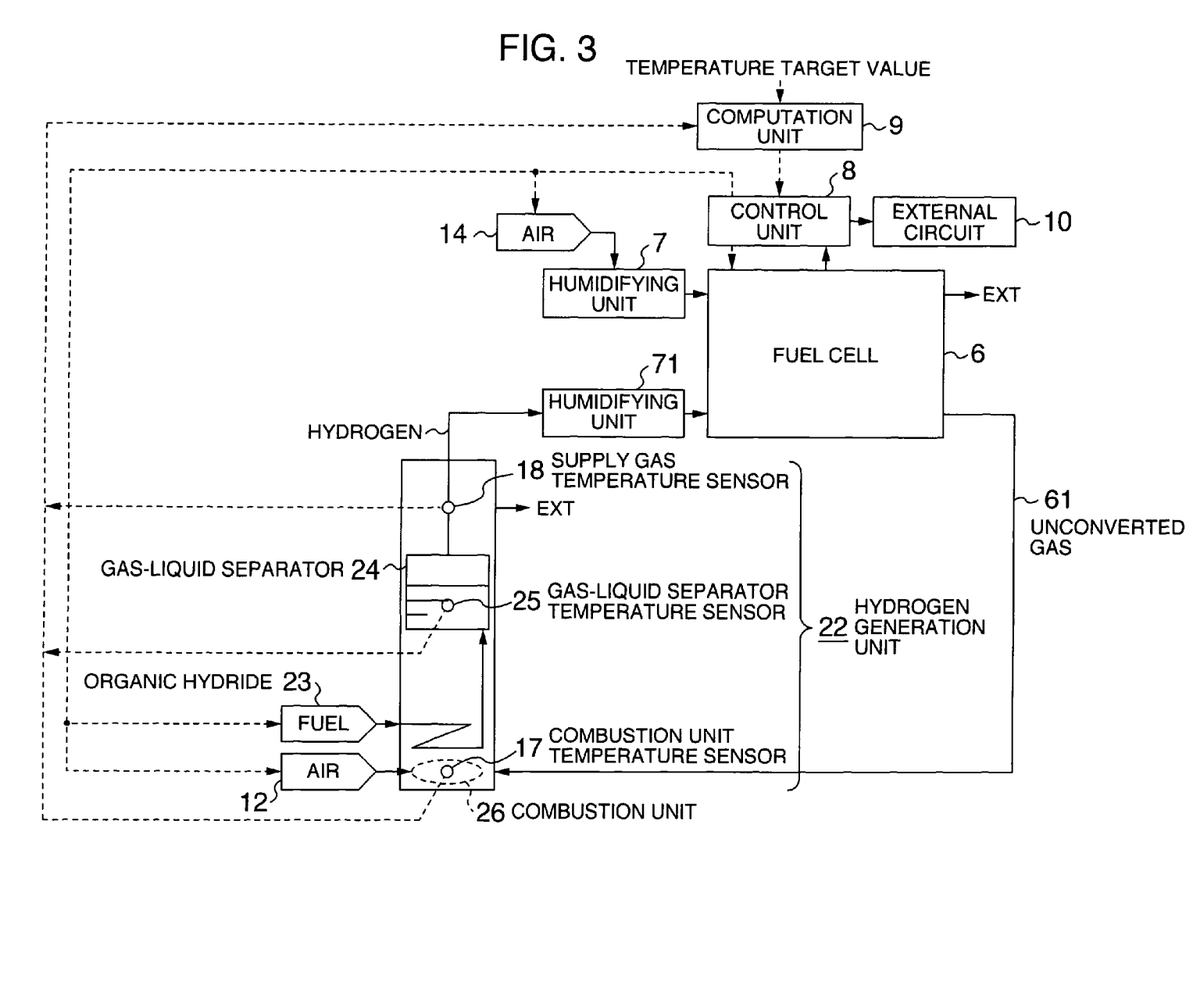
FIG. 3 is a block diagram showing a configuration of a fuel cell power generation system according to the second embodiment of the present invention.

FIG. 3 is a block diagram showing a configuration of a fuel cell power generation system according to a second embodiment of the present invention. In this embodiment, same reference numerals are assigned to components that are the same as those in the embodiment in FIG. 1, and a repeated description will be avoided. The second embodiment is different from the first embodiment in that, in place of the reformer 1 in FIG. 1, a hydrogen generation unit 22 is used, and the hydrogen generation unit 22 produces hydrogen fuel from hydrogenous material and supplies the fuel to the fuel cell 6. The hydrogen generation unit 22 employs an organic hydride 23 such as decalin or cyclohexane as the fuel. The control unit 8 controls the organic hydride 23 and the air 12 to be supplied to the hydrogen generation unit 22 and the air 14 to be supplied to the fuel cell 6. The unconverted gas 61 including an element such as hydrogen discharged from the fuel cell 6 is supplied as the fuel to the combustion unit 26 of the hydrogen generation unit 22. The combustion unit 26 burns the unconverted gas 61, thereby obtaining heat for causing hydrogen generation to proceed.

In order to control the temperature of the hydrogen generation unit 22, one or a combination of temperatures detected by the combustion unit temperature sensor 17, the supply gas temperature sensor 18, and a gas-liquid separator temperature sensor 25 of a gas-liquid separator 24, all of which detect temperatures of the hydrogen generation unit 22, is captured by the computation unit 9. Since specific control processing of temperature control by the hydrogen generation unit 22 is the same as the processing in the first embodiment described with reference to FIG. 2, a detailed description of the control processing will be omitted.

In the fuel cell power generation system that uses this organic hydride 23 as the fuel as well, even if some disturbance has been given to the system, the temperature of the hydrogen supply unit can be maintained within a predetermined temperature range using a simple configuration. The stability of the fuel cell power generation system can be thereby maintained. Then, by setting the first target power PT and the second target power PL for the generated power of the fuel cell to desired values, the amount of the generated power and the power generation efficiency can be held within allowable ranges.

Figure 4:
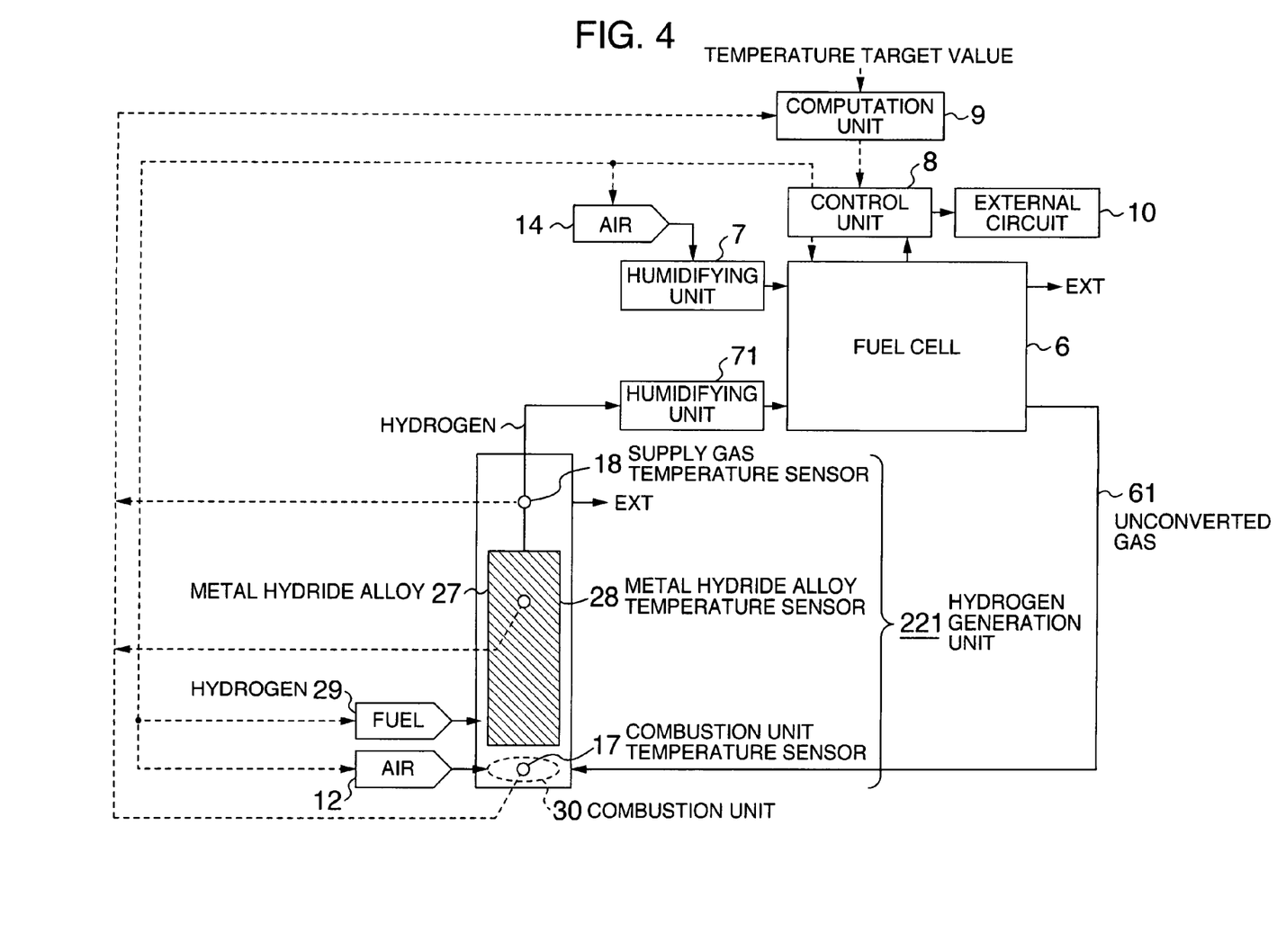
FIG. 4 is a block diagram showing a configuration of a fuel cell power generation system according to the third embodiment of the present invention.

FIG. 4 is a block diagram showing a configuration of a fuel cell power generation system according to the third embodiment of the present invention. Same reference characters are assigned to components that are the same as those in the embodiment in FIG. 3, and a repeated description will be avoided. The third embodiment is different from the second embodiment in that, in place of the hydrogen generation unit 22 in FIG. 3, a hydrogen generation unit 221 supplies the hydrogen fuel to the fuel cell 6. The hydrogen generation unit 221 employs a metal hydride alloy (hydrogen absorbing alloy) 27 to generate hydrogen. Further, hydrogen 29 to be supplied to the metal hydride alloy 27, the air 12 to be supplied to a combustion unit 30 of the hydrogen generation unit 221, and the air 14 to be supplied to the fuel cell 6 are controlled by the control unit 8. The unconverted gas 61 (including the element such as hydrogen) is supplied as the fuel to the combustion unit 30 of the hydrogen generation unit 221. By burning the unconverted gas 61, the combustion unit 30 obtains the heat for causing the hydrogen generation to proceed.

In order to control the temperature of the hydrogen generation unit 221, one or a combination of temperatures detected by the combustion unit temperature sensor 17, the supply gas temperature sensor 18, and a metal hydride alloy temperature sensor 28, all of which detect temperatures of the hydrogen generation unit 221, is captured by the computation unit 9. Since specific control processing of temperature control by the hydrogen generation unit 221 is the same as the processing in the first embodiment described with reference to FIG. 2, a detailed description of the control processing will be omitted.

In the fuel cell power generation system that uses this metal hydride alloy 27 as a hydrogen supply source as well, even if some disturbance has been given to the system, the temperature of the hydrogen supply unit can be maintained within a predetermined temperature range, using a simple configuration. The stability of the fuel cell power generation system can be thereby maintained. Then, by setting the first target power PT and the second target power PL for the generated power of the fuel cell to desired values, the amount of the generated power and the power generation efficiency can be held within allowable ranges.

The above-mentioned embodiments are summarized as follows: First, the fuel cell power generation system according to the present invention includes the hydrogen supply unit (constituted from the reformer 1, or hydrogen generation unit 22 or 221), oxygen supply unit (constituted from the air 14 and the humidifying unit 7), and the fuel cell 6. The hydrogen supply unit reforms the hydrogen fuel to produce the reformed gas including hydrogen, or causes reaction gas including the hydrogen to be generated from a hydrogen material. The fuel cell 6 receives the hydrogen and oxygen from the hydrogen supply unit and the oxygen supply unit, respectively, for power generation. The fuel cell power generation system further includes the temperature sensors (constituted from the combustion unit temperature sensor 17 and the supply gas temperature sensor 18, and one of the reforming unit temperature sensor 19, the gas-liquid separator temperature sensor 25, and the metal hydride alloy temperature sensor 28) for detecting temperatures of the hydrogen supply unit. The fuel cell power generation system also includes the temperature control unit (constituted from the computation unit 9 and the control unit 8) for adjusting the generated power of the fuel cell 6 based on one or a combination of temperatures detected by these temperature sensors, thereby controlling the temperature of the hydrogen supply unit (constituted from the reformer 1, and the hydrogen generating unit 22 or 221). The temperature control unit includes a target power setting unit for setting the first target power PT and the second target power PL as target values of the generated power of the fuel cell 6. The temperature control unit further includes a target power switching unit for performing target value switching the generated power of the fuel cell 6 between the first and second target powers.

By setting the first and second target powers to appropriate values for the fuel cell power generation system in view of the hydrogen utilization factor at which no hydrogen deficiency would occur and the power generation efficiency of the fuel cell, as described above, the stability of the system can be maintained using the simple configuration. It means that there is no need for using a complicated configuration in which the fuel cell power generation system is divided into a plurality of portions. Then, even if some disturbance has been given to the system, the temperature of the hydrogen supply unit can be maintained within the predetermined temperature range, so that the stabilized fuel cell power generation system can be implemented.

Figure 5:
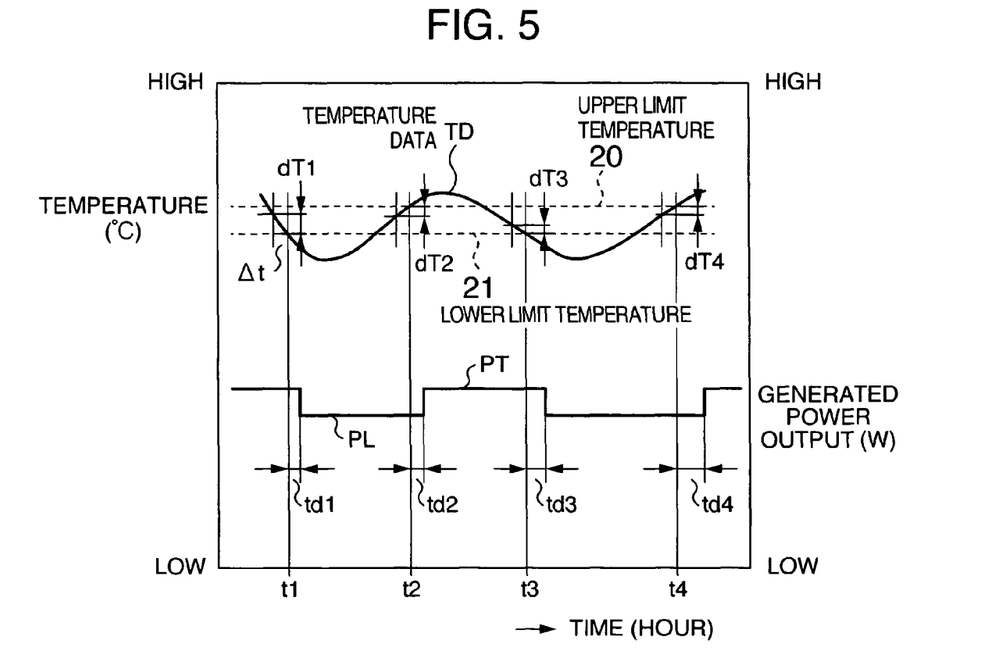
FIG. 5 is a graph explaining second temperature control processing that can be used in each of the first, second, and third embodiment of the present invention.

FIG. 5 is a graph explaining an operation of second temperature control processing that can be used in each of the first to third embodiments of the present invention. In this second control processing as well, the target value of the generated power of the fuel cell 6 is switched according to a deviation from a predetermined temperature set value. In addition, a response speed with which the target value of the generated power of the fuel cell 6 is switched is also changed according to the rate of change in the current temperature data TD. The second temperature control processing is different from the first temperature control processing in that according to the gradient of rise and fall of the temperature data TD, the speed with which the target value is switched is adjusted.

First, assume that the temperature data TD captured from one or more of the temperature sensors has become lower than the set lower limit temperature 21 at the time t1, as shown in FIG. 5. This case shows that the amount of heat of the reformer 1 is insufficient. Thus, the computation unit 9 and the control unit 8 reduce the generated power of the fuel cell 6 from the hitherto used first target power PT to the reduced second target power PL. The operation up to this stage is the same as that in the embodiments described before. In this embodiment, when the temperature data TD has reached the lower limit temperature 21, the computation unit 9 computes the rate of change of the temperature data TD. As an example of the computation, the computation unit 9 computes a change amount dT1 of the temperature data TD in a time period Δt immediately before the temperature data TD has become lower than the lower limit temperature 21, and then switches the target power of the fuel cell 6 with the response speed corresponding to the magnitude of the change amount dt1. In this case, the change amount dT1 of the temperature data TD is large. Thus, the computation unit 9 performs switching to the reduced second target power PL with a fast response or with a small time delay td1.

Next, assume that the temperature data TD has become higher than the set upper limit temperature 20 at the time t2. This case shows that the amount of heat of the reformer 1 is superfluous. Thus, the computation unit 9 and the control unit 8 reduce the generated power of the fuel cell 6 from the hitherto used reduced second target power PL to the first target power PT. When the temperature data TD has reached the upper limit temperature 20, the computation unit 9 computes the rate of change of the temperature data TD from a change amount dT2 of the temperature data TD in the time period Δt immediately before the temperature data TD has become higher than the upper limit temperature 20, and then switches the target power of the fuel cell 6 with the response speed corresponding to the magnitude of the change amount dT2. In this case, the change amount dT2 of the temperature data TD is comparatively large. Thus, the computation unit 9 performs switching to the first target power PT with a comparatively fast response or with a small time delay td2.

In the fuel cell power generation system to which the above-mentioned control has been applied, using the temperature data TD captured from one or more of the temperature sensors and the amount of the reaction gas controlled by the control unit 8, the computation unit 9 makes operation for switching the generated power of the fuel cell 6 so that the temperature data TD captured from the one or more of the temperature sensors becomes constant. Further, the computation unit 9 computes the gradient of a change in temperature sensed by the one or more of the temperature sensors, and then adjusts the time during which generation of the power of the fuel cell 6 computed by the computation unit 9 is maintained.

This embodiment is summarized as follows: First, this embodiment includes the target power setting unit for setting the first target power PT and the second target power PL that is lower than the first target power PT. Then, this embodiment also includes the generated power control unit 8. When the detected temperature data TD has exceeded the scheduled upper limit temperature 20, the generated power control unit 8 switches the target of the generated power of the fuel cell 6 to the first target power PT with the response speed td2 corresponding to a time change rate (dT2/Δt). On the other hand, when the detected temperature data TD has fallen below the scheduled lower limit temperature 21, the generated power control unit 8 switches the target of the generated power of the fuel cell 6 to the second target power PL with a response speed td3 corresponding to a time change rate (dT3/Δt) of the temperature data TD.

By performing the control as described above, even if a time lag is present in the response of temperature sensing by the one or more of the temperature sensors, a fuel cell generation system can perform satisfactory temperature control by taking into consideration of a trend of the measured temperature data captured from the one or more of the temperature sensors.

Figure 6:
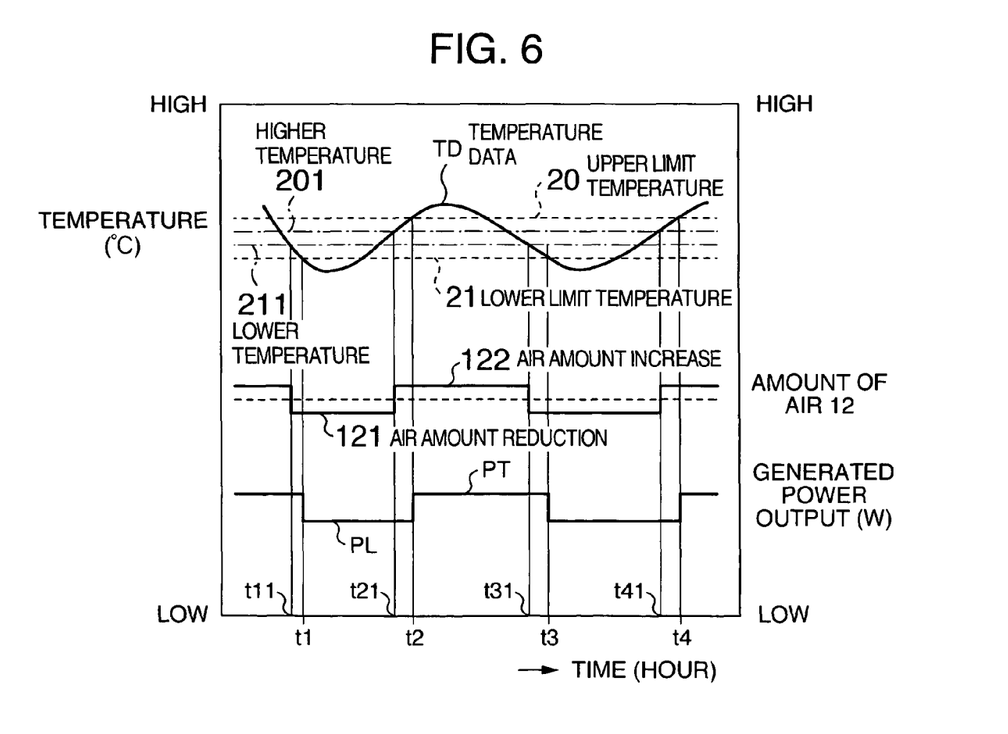
FIG. 6 is a graph explaining third temperature control processing that can be used in each of the first, second, and third embodiment of the present invention.

FIG. 6 is a graph explaining third temperature control processing that can be used in each of the first to third embodiments of the present invention. The third control processing is the same as the second control processing in that the target value of the generated power of the fuel cell 6 is switched according to a deviation from a predetermined temperature set value. However, before this switching, the computation unit 9 controls the quantity of air to be supplied to the heat source or the amount of supply of an oxidizer for combustion so that the temperatures detected by the temperature sensors are constant, using the temperature data TD captured from the one or more of the temperature sensors and the amount of the reaction gas controlled by the control unit 8. First, based on the result of computation by the computation unit 9, the control unit 8 controls the air 12 to be supplied to the reformer 1 or the hydrogen generation unit 22 or 221, thereby changing the combustion temperature of the combustion unit 2, 26, or 30, for temperature control. Then, when a great change in the temperature data of one or more of the temperature sensors is not present, the generated power of the fuel cell 6 is changed to perform proper temperature control.

In an example in FIG. 6, in addition to the upper limit temperature 20 and the lower limit temperature 21 described in FIGS. 2 and 5, a higher temperature 201 and a lower temperature 211 are set to evaluate the temperature data TD. Then, at a time t11 before the temperature data TD becomes lower than the set lower limit temperature 21 at the time t1, it is detected that the temperature data TD has reached the lower temperature 211. Then, an air quantity reduction command 121 is issued to reduce the volume of the air 12 to the combustion unit 2, 26, or 30 of the hydrogen supply unit, and control is performed so that the temperature data rises. If the temperature data rises by this control, it is not necessary to reduce the target value of the generated power.

However, if the temperature data has not risen even by this control and has become lower than the set lower limit temperature 21, switching of the target value of the generated power to the reduced second target power PL described before is performed.

At a time t21 before the temperature data TD becomes lower than the set lower limit temperature 21 at the time t2, it is detected that the temperature data TD has reached the higher temperature 201. Then, an air quantity increase command 122 is issued to increase the volume of the air 12 to the combustion unit 2, 26, or 30 of the hydrogen supply unit, and control is performed so that the temperature data falls. If the temperature data falls by this control, it is not necessary to increase the target value of the generated power.

However, if the temperature data has not rises even by this control and has become higher than the set upper limit temperature 20, switching of the target value of the generated power to the first target power PT described before is performed.

In this embodiment, the controls as described above are applied: First, the air 12 to be supplied to the reformer 1 or the hydrogen generation units 22 and 221 is controlled. Then, as a second stage, the generated power of the fuel cell 6 is controlled. Accordingly, as compared with the case where the individual control such as that in the first and second temperature control processing is performed, when this combination of the controls is performed satisfactory temperature controllability is achieved over a wider temperature range.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control method of a fuel cell power generation system, the fuel cell power generation system including
   a hydrogen supply unit which generates reaction gas including hydrogen,
   an oxygen supply unit,
   a fuel cell that receives hydrogen from the hydrogen supply unit and oxygen from the oxygen supply unit, and that generates electric power,
   a temperature sensor that detects a temperature of the hydrogen supply unit, and
   a temperature control unit that controls power generated by the fuel cell, so that the temperature detected by the temperature sensor is held within a predetermined range, said temperature control unit configured to perform the control method comprising the steps of:

defining a first target power value, and a second target power value lower than the first target power value, as target values of the power generated by the fuel cell;

when the detected temperature exceeds a first scheduled temperature, setting the target value of the power generated by the fuel cell to the first target power value, and also setting a response speed of the setting of the target value according to a rate of change of the detected temperature of the hydrogen supply unit; and when the detected temperature falls below a second scheduled temperature that is lower than the first scheduled temperature, setting the target value of the power generated by the fuel cell to the second target power value, and also setting a response speed according to a rate of change of the detected temperature of the hydrogen supply unit.

2. The control method of the fuel cell power generation system according to claim 1, further comprising the steps of:
setting an upper limit temperature of the detected temperature, wherein said upper limit temperature is used as said first scheduled temperature; and
setting a lower limit temperature of the detected temperature, wherein said lower limit temperature is used as said second scheduled temperature.

3. A control method of a fuel cell power generation system, the fuel cell power generation system including
a hydrogen supply unit that generates reaction gas including hydrogen,
an oxygen supply unit that supplies oxygen,
a fuel cell that receives hydrogen from the hydrogen supply unit and oxygen from the oxygen supply unit, and that generates electric power,
a temperature sensor that detects a temperature of the hydrogen supply unit, and
a temperature control unit that controls power generated by the fuel cell so that the temperature detected by the temperature sensor is held within a predetermined range, said temperature control unit configured to perform the control method comprising the steps of:
a first temperature control step of increasing supply of an oxidizer for combustion to the hydrogen supply unit when the detected temperature of the hydrogen supply unit exceeds a first predetermined range, and decreasing supply of the oxidizer for combustion to the hydrogen supply unit when the detected temperature falls below the first predetermined range; and
a second temperature control step of increasing or decreasing the power generated by the fuel cell when the detected temperature falls outside a second predetermined range, wherein the second temperature control step comprises the steps of:
defining a first target power value, and defining a second target power value lower than the first target power value, as target values of the power generated by the fuel cell; and
when the detected temperature exceeds a first scheduled temperature, setting a target value of the power generated by the fuel cell to the first target power value, and also setting a response speed of the setting of the target value according to a rate of change of the detected temperature; and
when the detected temperature falls below a second scheduled temperature lower than the first scheduled temperature, setting the target value of the power generated by the fuel cell to the second target power value, and also setting a response speed of the setting of the target value according to a rate of change of the detected temperature.

4. The control method of the fuel cell power generation system according to claim 1, wherein said hydrogen supply unit reforms hydrocarbon fuel to generate reformed gas including hydrogen.

5. The control method of the fuel cell power generation system according to claim 1, wherein said hydrogen supply unit produces the reaction gas including hydrogen from hydrogenous material.

6. The control method of the fuel cell power generation system of claim 3, further comprising:
an oxidizer supply unit for supplying the oxidizer for combustion to the hydrogen supply unit.

7. A fuel cell power generation system comprising:
a hydrogen supply unit which generates reaction gas including hydrogen;
an oxygen supply unit;
a fuel cell that receives hydrogen from the hydrogen supply unit and oxygen from the oxygen supply unit, and that generates electric power;
a temperature sensor that detects a temperature of the hydrogen supply unit; and
a temperature control unit that controls power generated by the fuel cell, so that the temperature detected by the temperature sensor is held within a predetermined range, said temperature control unit configured to perform the steps of:
defining a first target power value, and a second target power value lower than the first target power value, as target values of the power generated by the fuel cell;
when the detected temperature exceeds a first scheduled temperature, setting the target value of the power generated by the fuel cell to the first target power value, and also setting a response speed of the setting of the target value according to a rate of change of the detected temperature of the hydrogen supply unit; and
when the detected temperature falls below a second scheduled temperature that is lower than the first scheduled temperature, setting the target value of the power generated by the fuel cell to the second target power value, and also setting a response speed according to a rate of change of the detected temperature of the hydrogen supply unit.

8. The fuel cell power generation system according to claim 7, wherein the temperature control unit is configured to further perform the steps of:
setting an upper limit temperature of the detected temperature, wherein said upper limit temperature is used as said first scheduled temperature; and
setting a lower limit temperature of the detected temperature, wherein said lower limit temperature is used as said second scheduled temperature.

9. The fuel cell power generation system according to claim 7,
wherein the temperature control unit is configured to perform a first temperature control step of increasing supply of an oxidizer for combustion to the hydrogen supply unit when the detected temperature of the hydrogen supply unit exceeds a first predetermined range, and decreasing supply of the oxidizer for combustion to the hydrogen supply unit when the detected temperature falls below the first predetermined range; and
wherein the temperature control unit is configured to perform the steps recited in claim 7 as part of a second temperature control step of increasing or decreasing the power generated by the fuel cell when the detected temperature falls outside a second predetermined range.

* * * * *